(12) United States Patent  (10) Patent No.: US 7,145,859 B2
Park et al.  (45) Date of Patent: Dec. 5, 2006

(54) COMPATIBLE OPTICAL PICKUP AND METHOD OF ALIGNING OPTICAL AXES THEREIN

(75) Inventors: Soo-han Park, Gyeonggi-do (KR); Young-sun Park, Gyeonggi-do (KR); Moon-lwhan Lee, Gyeonggi-do (KR); Do-hoan Nam, Gyeonggi-do (KR); Chun-seong Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 410 days.

(21) Appl. No.: 10/244,605

(22) Filed: Sep. 17, 2002

(65) Prior Publication Data

US 2003/0053394 A1   Mar. 20, 2003

(30) Foreign Application Priority Data

Sep. 17, 2001  (KR) ................................ 2001-57179

(51) Int. Cl.
 *G11B 7/135* (2006.01)
(52) U.S. Cl. ........................ 369/112.05; 369/112.24; 369/44.37
(58) Field of Classification Search ........... 369/112.05, 369/112.16, 121, 120, 112.24, 44.37, 124.24
 See application file for complete search history.

(56) References Cited

U.S. PATENT DOCUMENTS

| 4,574,371 | A | * | 3/1986 | Takemura et al. ........... 369/100 |
| 4,859,847 | A |   | 8/1989 | Matsuno et al. |
| 5,132,959 | A | * | 7/1992 | Ishika .................... 369/112.17 |
| 5,341,246 | A |   | 8/1994 | Oono et al. |
| 5,490,128 | A | * | 2/1996 | Ogata .......................... 369/116 |
| 5,648,945 | A |   | 7/1997 | Iwanaga |
| 6,111,842 | A |   | 8/2000 | Nishino et al. |
| 6,141,301 | A | * | 10/2000 | Oakley ..................... 369/44.23 |
| 6,633,530 | B1 | * | 10/2003 | Takeda ................... 369/112.01 |
| 6,836,452 | B1 | * | 12/2004 | Matsuda .................. 369/44.14 |
| 2001/0026525 | A1 |  | 10/2001 | Takahashi |

FOREIGN PATENT DOCUMENTS

| CN | 1250212 |   | 4/2000 |
| CN | 1273414 |   | 11/2000 |
| EP | 0 553 551 |   | 8/1993 |
| EP | 582958 | * | 7/1994 |
| EP | 0 727 776 |   | 8/1996 |
| EP | 0 795 855 |   | 9/1997 |
| JP | 2001-67716 |   | 3/2001 |
| KR | 2001-47945 |   | 6/2001 |
| KR | 1020010047945 | * | 6/2001 |

* cited by examiner

*Primary Examiner*—Wayne Young
*Assistant Examiner*—Van Pham
(74) *Attorney, Agent, or Firm*—Staas & Halsey LLP

(57) ABSTRACT

An optical pickup includes a light source which emits first and second lights having different wavelengths for a first recording medium and a second recording medium having a relatively large thickness, respectively, an optical path changer which alters a traveling path of incident light, and an objective lens which focuses the first and second lights on the recording medium. While the light source emits the first light, a photodetector is adjusted to be aligned with the optical axis for the first recording medium. The light source and/or a sensing lens are adjusted in the direction of the optical axis, and the tilt of the objective lens is adjusted. Next, while the light source is operated to emit the second light, the light source is adjusted in a rotating direction. As such, an optical axis alignment is completed for the first and second recording media.

14 Claims, 10 Drawing Sheets

COMPATIBLE OPTICAL PICKUP AND METHOD OF ALIGNING OPTICAL AXES THEREIN

CROSS-REFERENCE TO RELATED APPLICATION

This application claims the benefit of Korean Application No. 2001-57179, filed Sep. 17, 2001 in the Korean Intellectual Property Office, the disclosure of which is incorporated herein by reference.

BACKGROUND OF THE INVENTION

1. Field of the Invention

The present invention relates to a compatible optical pickup using a light source emitting light of two different wavelengths and a method of aligning an optical axis in the compatible optical pickup.

2. Description of the Related Art

Optical recording and/or reproduction apparatuses for digital versatile disc family recording media (hereinafter, DVD) capable of performing high-density information recording and/or reproduction should generally also be compatible with compact disc family recording media (hereinafter, CD). the conventional CD has a standard thickness of 1.2 mm, whereas the DVD has a standard thickness of 0.6 mm in consideration of a disc tilt tolerance and a numerical aperture (NA) of an objective lens. Light sources for DVD and CD reproduction have different wavelengths. Reproduction of the CD uses light having a wavelength of about 780 nm, and reproduction of the DVD uses light having a wavelength of about 650 nm. With regard to a CD-R having an organic dye layer as a recording layer, its data are damaged when using light of a 650-nm wavelength. therefore, an optical recording and/or reproduction apparatus for a DVD usually uses a compatible optical pickup using light of two different wavelengths to perform recording and/or reproduction on the CD family recording media, including the CD-R.

As shown in FIG. 1, a compatible optical pickup using two light sources 1 and 3, which emit different wavelengths of light, and one photodetector 19 has been suggested in the prior art. Referring to FIG. 1, the conventional compatible optical pickup includes a first light source 1 for emitting light of a 650-nm wavelength and a second light source 3 for emitting light of a 780-nm wavelength. Light emitted from the first light source 1 is used to record information on and/or reproduce information from a DVD 10a having a relatively small thickness. Light emitted from the second light source 3 is used to record information on and/or reproduce information from a CD 10b having a relatively large thickness.

The light emitted from the first light source 1 is reflected by a plate-type beam splitter 7, is transmitted through a cubic beam splitter 9, and proceeds toward a disc 10, which is a received one of the CD 10b and DVD 10a. the light emitted from the second light source 3 is reflected by the cubic beam splitter 9 and proceeds toward the disc 10. An objective lens 15 focuses light incident from the first and second light sources 1 and 3 to form a light spot on the disc 10. the light emitted from the first light source 1 is focused on the DVD 10a having a relatively small thickness, and the light emitted from the second light source 3 is focused on the CD 10b having a relatively large thickness. Light reflected from the disc 10 is sequentially transmitted through the objective lens 15, the cubic beam splitter 9, and the plate-type beam splitter 7, and is received by a photodetector 19.

In FIG. 1, a grating 5 is used to diffract the light from the second light source 3 to be $0^{th}$-, $+1^{st}$-, and $-1^{st}$ order diffracted beams so as to detect a tracking error signal by a three-beam method during recording and/or reproduction. A collimating lens 11 collimates diverging light from the first and second light sources 1 and 3. A light sensing lens 17 condenses the light incident through the cubic beam splitter 9 after being reflected by the disc 10 such that the light is received by the photodetector 19.

Since the conventional optical pickup having the above structure includes the two light sources 1 and 3, it is compatible with both the DVD 10a and the CD 10b. However, the conventional compatible optical pickup uses the two light sources 1 and 3 which are separately disposed, which complicates the optical axis alignment with respect to the first and second light sources 1 and 3 and an assembly process.

In particular, in the compatible optical pickup using the two light sources 1 and 3, after the optical elements used with the DVD 10a are adjusted for an optimal DVD optical axis alignment, the optical elements used with the CD 10b are adjusted for a CD optical axis alignment. The optical axis of the first light source 1 for the DVD 10a is first adjusted, and the optical axis of the second light source 3 for the CD 10b is adjusted. Since the first and second light sources 1 and 3 are located at different positions, an adjusting point is different for the first and second light sources 1 and 3. After the DVD optical axis alignment, the second light source 3 is adjusted in three dimensions, which is difficult to control for the CD optical axis alignment the three-dimensional adjustment of the second light source 3 for the CD optical axis alignment is needed because the optical axis for the CD is affected by multiple parameters, such as the position and angle of the second light source 3 and the position and angle of the cubic beam splitter 9. As a result, the assembly and optical axis alignment processes for the conventional compatible optical pickup including the two light sources 1 and 3 are complicated. In addition, a tilt of the objective lens 15 finally adjusted to be aligned with the DVD optical axis does not match the optical axis of the second light source 3 for the CD. the conventional compatible optical pickup using two light sources, having the above drawbacks, reduces process reproducibility and productivity and increases the manufacturing cost.

The arrows shown in FIG. 1 indicate the directions in which the optical devices are adjusted for the CD optical axis alignment. In particular, to align the optical axis for the CD, the second light source 3 is adjusted in three dimensions, the grating 5, the objective lens 15, and the photodetector 19 are adjusted in two dimensions, and the cubic beam splitter 9 and the light sensing lens 17 are adjusted in one dimension.

FIG. 2 shows another example of a conventional compatible optical pickup including a light source 20 for emitting first and second lights I' and II' having different wavelengths. The lights I' and II" are emitted separated a predetermined interval from one another. A hologram coupler 25 compensates for the distance between the optical axes of the first and second lights I' and II" having different wavelengths and is currently being developed. In FIG. 2, the same reference numerals as those in FIG. 1 denote the same or similar functional elements as those in FIG. 1, and thus descriptions thereof are not repeated here.

The light source 20 is a 2-wavelength-1-laser light source and emits the first light I' of a wavelength of about 650 nm and the second light II' of a wavelength of about 780 nm. The first light I' is used for recording and/or reproduction on the DVD 10a, and the second light II' is used for recording and/or reproduction on the CD 10b. When the hologram coupler 25 is disposed between the light source 20 and a plate-type beam splitter 27, the light source 20 is constructed to emit the second light II' at a predetermined angle with respect to the first light I'. the hologram coupler 25 transmits the first light I' incident perpendicular to one side and diffracts and transmits most of the second light II' incident thereon at an angle such that the first light I' and the second light II' proceed parallel to each other.

Alternatively, the light source 20 can be constructed to emit the first and second lights I' and II' parallel to each other with a predetermined separation from each other. In this case, the hologram coupler 25 is disposed between the plate-type beam splitter 27 and the photodetector 19.

When the hologram coupler 25 is disposed between the plate-type beam splitter 27 and the photodetector 19, as shown in FIG. 3, the hologram coupler 25 transmits the first light I' between the first and second lights I' and II', which are incident thereon parallel to each other with the predetermined separation from each other, and diffracts and transmits the second light II'. As such, the first light I' and the second light II' are received together at the same portion of the photodetector 19.

In FIGS. 2 and 3, the arrows indicate the directions in which the optical elements are adjusted to align the optical axis for the DVD and the CD. In the conventional compatible optical pickups described with reference to FIGS. 2 and 3, the first and second lights I' and II' that proceed separated a predetermined interval from one another are adjusted to be aligned with the same axis using the hologram coupler 27 so as to proceed parallel to each other or to be gathered on the photodetector 19. In these structures, the optical axis for the DVD that has been aligned is changed as a result of the optical axis alignment for the CD. therefore, the optical axis alignment for the DVD and CD needs to be repeatedly performed.

SUMMARY OF THE INVENTION

To solve the above and other problems, it is an object of the present invention to provide a compatible optical pickup which does not need compensation for the optical axis mis-alignment between two light beams having different wavelengths which are emitted from a light source, separated from one other, and a method of aligning an optical axis in the compatible optical pickup.

Additional objects and advantages of the invention will be set forth in part in the description which follows and, in part, will be obvious from the description, or may be learned by practice of the invention.

In an embodiment of the present invention, a compatible optical pickup includes a light source which emits first and second lights having different wavelengths, separated a predetermined interval from one another, for use with first and second recording media having different thicknesses, an optical path changer which alters a traveling path of incident light, an objective lens disposed in an optical path between the optical path changer and a received one of the first and second recording media and which focuses the emitted one of the first and second lights to form a light spot on the received one recording medium, and a photodetector which receives and detects the first and second lights incident thereon, separated from one another, through the optical path changer after having been reflected from the recording medium.

According to an aspect of the present invention, the photodetector comprises first and second main light receiving portions for the respective first and second lights.

According to another aspect of the present invention, the compatible optical pickup further comprises a support member which supports the optical source to be adjustable in the direction of the optical axis and/or in a rotating direction.

According to yet another aspect of the present invention, the photodetector is adjustable in a rotating direction.

According to still another aspect of the present invention, the compatible optical pickup further comprises a grating in an optical path between the light source and the optical path changer, which diffracts the second light emitted from the light source to provide at least three diffracted light beams.

According to still yet another aspect of the present invention, the photodetector further comprises a pair of sub-light receiving portions which receive and detect the diffracted light beams of the second light split.

According to a further aspect of the present invention, the compatible optical pickup further comprises a support member which supports both the light source and the grating so as to be adjustable in the direction of the optical axis and/or in the rotating direction.

In another embodiment of the present invention, a method of aligning an optical axes in a compatible optical pickup, which includes a light source which emits first and second lights having different wavelengths, separated a predetermined interval from one another, for first and second recording media having different thicknesses, an optical path changer which alters a traveling path of incident light, and an objective lens which focuses the first and second lights to form a light spot on the recording medium, the method comprising, while the light source is operated to emit the first light for the first recording medium, adjusting a photodetector which receives and detects the first and second lights incident thereon, separated from one another, after having been reflected from the recording medium and having passed through the optical path changer to be aligned with a first optical axis for the first recording medium, adjusting the light source and/or a sensing lens disposed between the optical path changer and the photodetector, in a direction along an optical path of the first light, and adjusting a tilt of the objective lens, to complete the first optical axis alignment for the first recording medium; and, while the light source is operated to emit the second light for the second recording medium, the light source is rotatably adjusted in a rotating direction to complete the second optical axis alignment for the second recording medium.

According to another aspect of the present invention, the adjusting the optical axis alignment for the second recording medium further comprises rotatably adjusting a grating disposed between the light source and the optical path changer in the rotating direction, separately from the rotatably adjusting the light source.

According to yet another aspect of the present invention, the aligning method further comprises rotatably adjusting the photodetector in the rotating direction such that the second light emitted from the light source is received at an appropriate position on the photodetector.

According to a further embodiment of the present invention, a method of aligning optical axes in a compatible optical pickup, which includes a light source which emits first and second lights having different wavelengths, separated a predetermined interval from one another, for first and second recording media having different thicknesses, an optical path changer which alters a traveling path of incident light, and an objective lens, which focuses the first and second lights to form a light spot on a received one of the first and second recording media, the method comprising, while the light source is operated to emit the second light for the second recording medium, adjusting a photodetector which receives and detects the first and second lights incident thereon, separated from one another, after having been reflected from the recording medium and having passed through the optical path changer, to be aligned with a second optical axis for the second recording medium, adjusting the light source and/or a sensing lens disposed between the optical path changer and the photodetector, in a direction along an optical path of the second light to complete the second optical axis alignment for the second recording medium, and, while the light source is operated to emit the first light for the first recording medium, the light source is rotatably adjusted in a rotating direction to complete a first optical axis alignment for the first recording medium.

According to an aspect of the present invention, the second optical axis alignment for the second recording medium further comprises rotatably adjusting a grating, which is disposed between the light source and the optical path changer and/or the light source and diffracts incident light, in the rotating direction so as to adjust positions of at least three light beams diffracted by the grating and received on the photodetector.

According to another aspect of the present invention, the method further comprises rotatably adjusting the photodetector in the rotating direction such that the second light emitted from the light source is received at an appropriate position on the photodetector corresponding to the second optical axis.

According to an additional embodiment of the present invention, a method of aligning optical axes in a compatible optical pickup, which includes a light source which emits first and second lights having different wavelengths, separated a predetermined interval from one another, for first and second recording media having different thicknesses, an optical path changer which alters a traveling path of incident light, and an objective lens which focuses the first and second lights to form a light spot on the recording medium, the method comprising, while the light source is operated to emit the second light for the second recording medium, initially adjusting a photodetector, which receives and detects the first and second lights incident thereon, separated from one another, after having been reflected from the recording medium and having passed through the optical path changer, to be aligned with a second optical axis for the second recording medium, rotatably adjusting the light source in a rotating direction to be aligned with a first optical axis for the first recording medium, adjusting the light source in a direction along an optical path between the light source and the optical path; and adjusting a tilt of the objective lens.

According to an aspect of the present invention, between adjusting the photodetector and adjusting the light source in the direction of the optical path, the method further comprises rotatably adjusting the light source and/or a grating disposed between the light source and the optical path changer in the rotating direction to adjust the positions of at least three light beams diffracted by the grating and received on the photodetector.

According to yet another aspect of the present invention, the method further comprises, after the adjusting the tilt, selectively adjusting the light source in one of the direction of the optical path or in the rotating direction when the second optical axis for the second recording medium is determined to be greatly displaced from its initially adjusted position.

According to still another aspect of the present invention, the method further comprises adjusting the photodetector in the rotating direction such that the second light emitted from the light source is received at an appropriate position on the photodetector.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Figure 1:
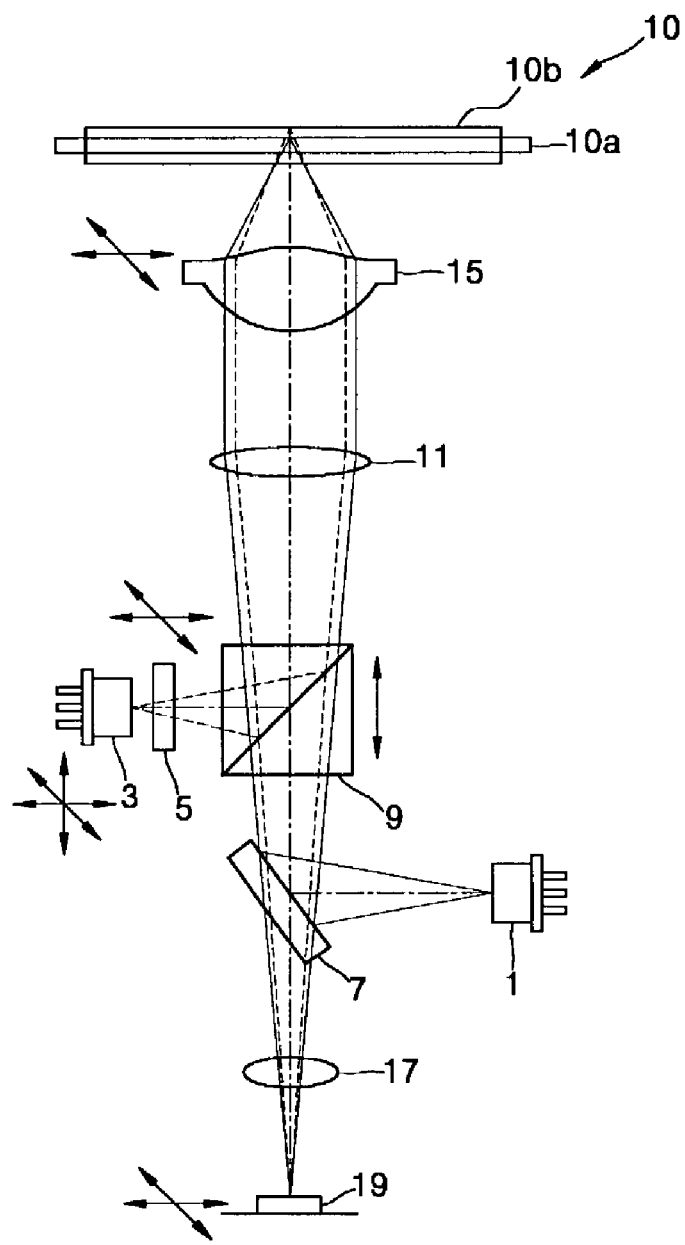
FIG. 1 shows a first example of a conventional compatible optical pickup.
Figure 2:
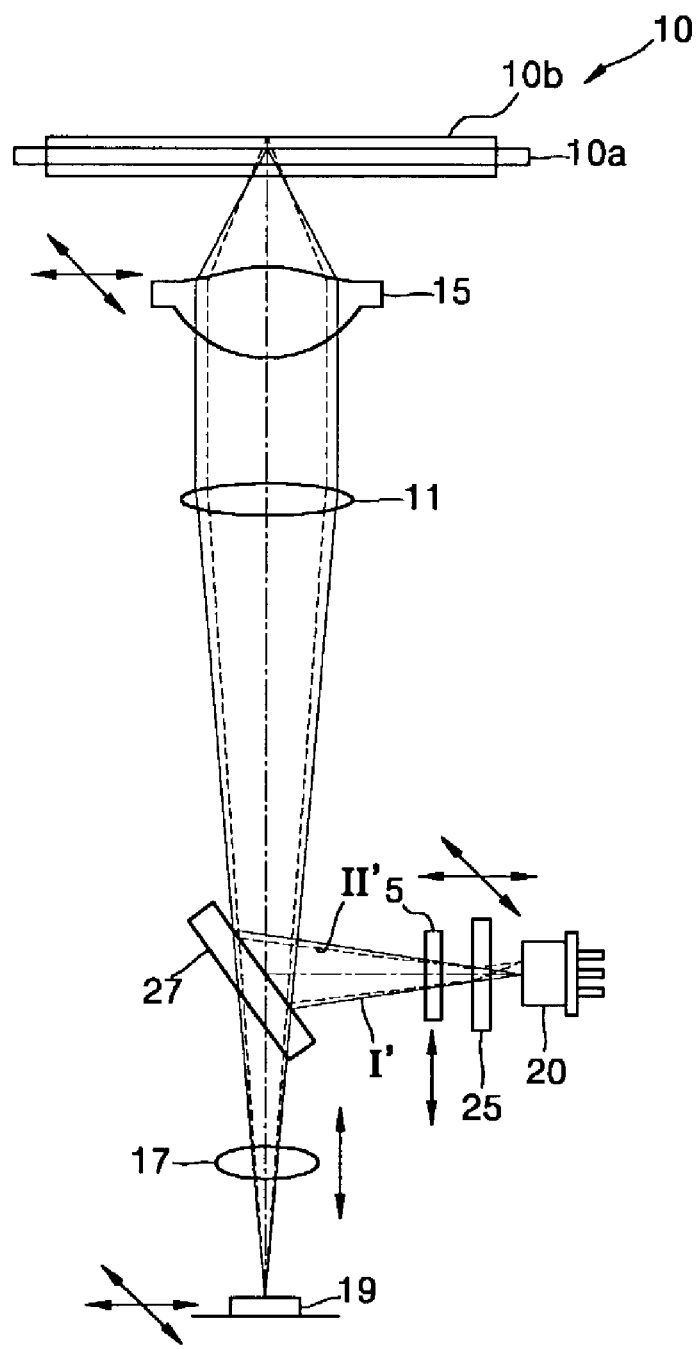
FIG. 2 shows a second example of a conventional compatible optical pickup.
Figure 3:
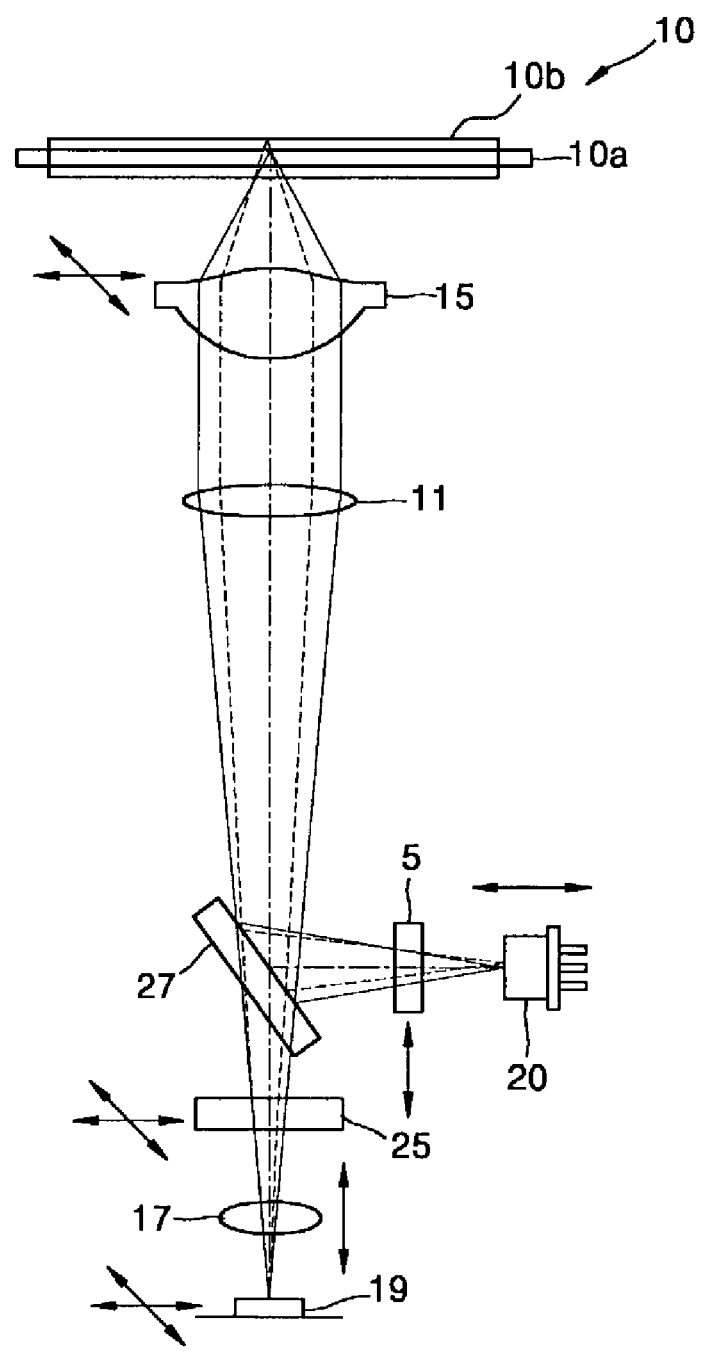
FIG. 3 shows a third example of a conventional compatible optical pickup.

Reference will now be made in detail to the present embodiments of the present invention, examples of which are illustrated in the accompanying drawings, wherein like reference numerals refer to the like elements throughout. the embodiments are described below in order to explain the present invention by referring to the figures.

Figure 4:
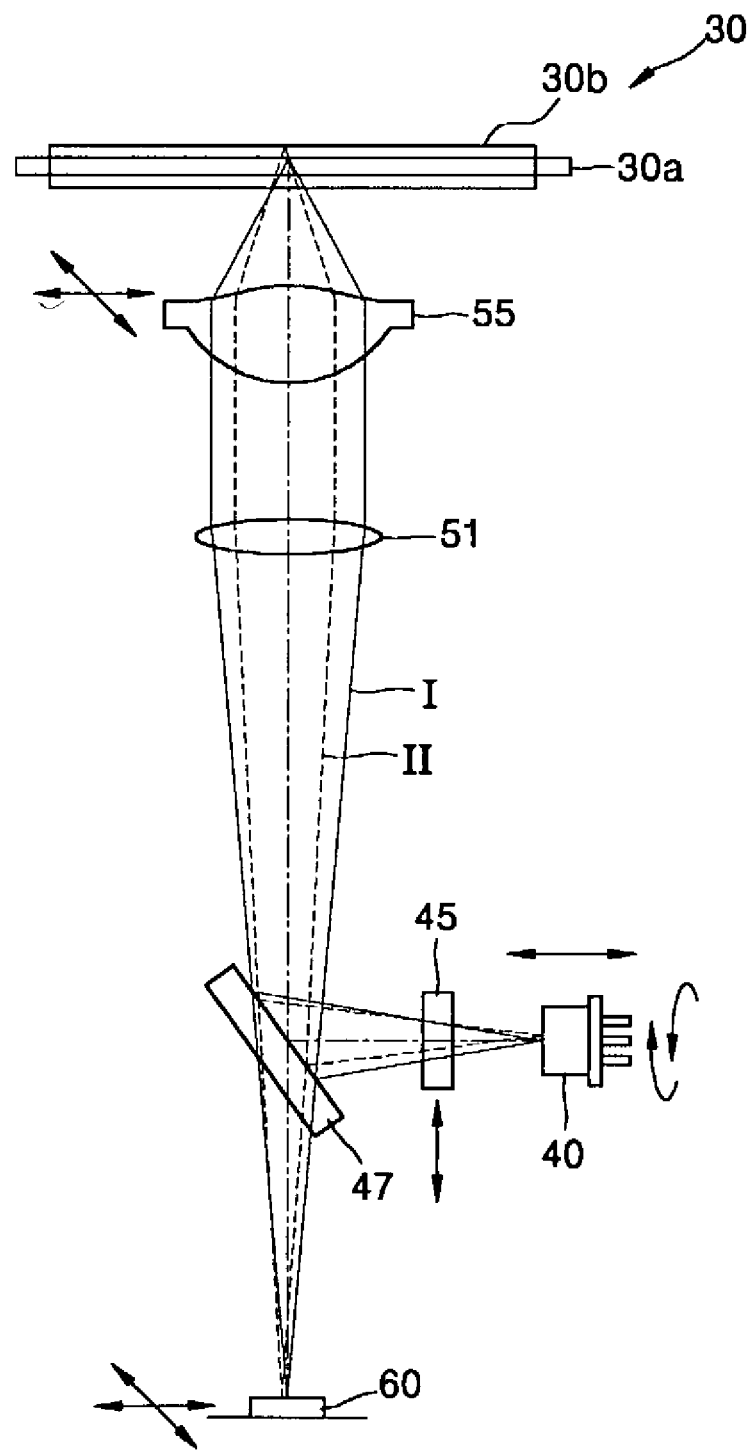
FIG. 4 shows a compatible optical pickup having an infinite optical arrangement according to an embodiment of the present invention.
Figure 5:
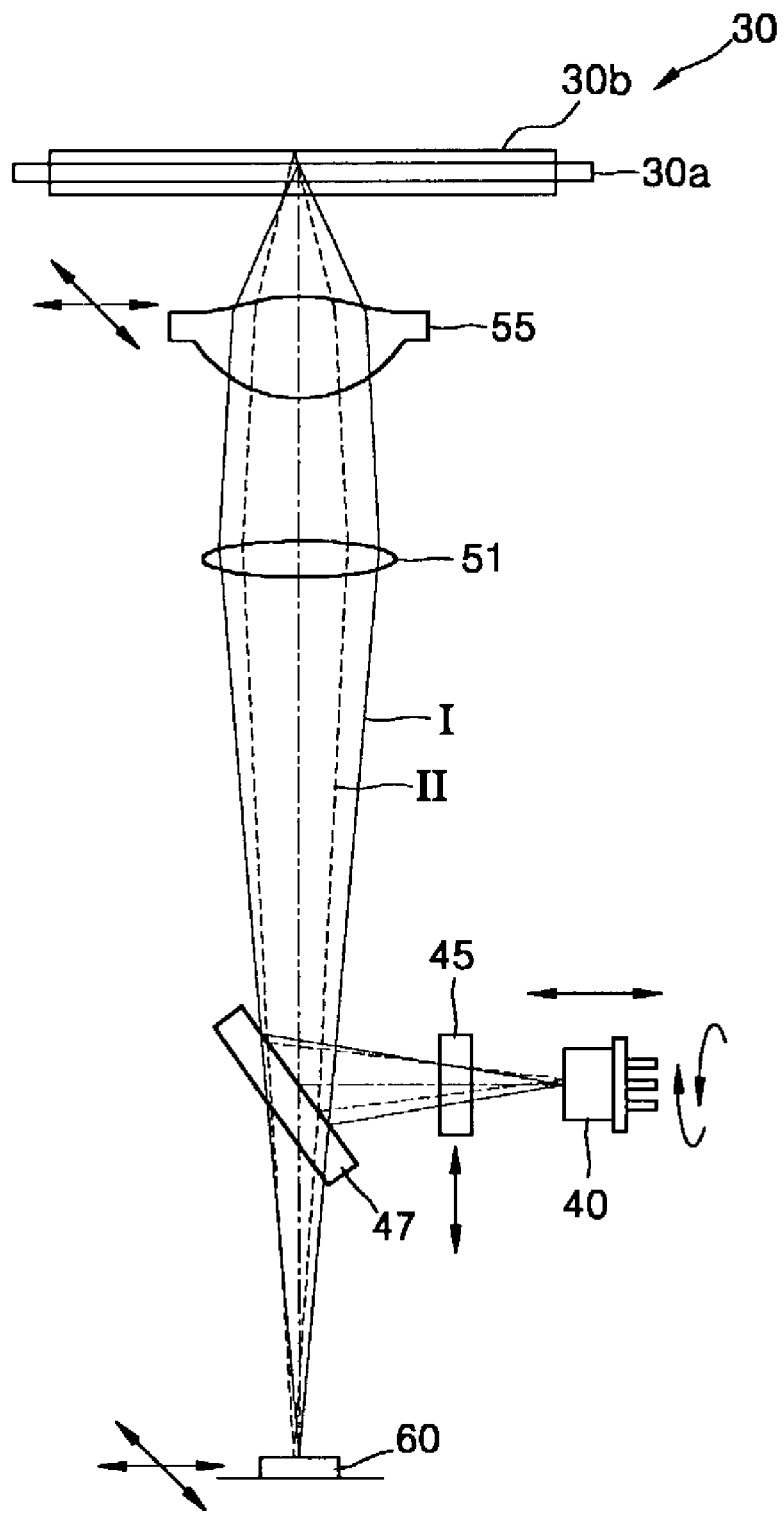
FIG. 5 shows a compatible optical pickup having a finite optical arrangement according to an embodiment of the present invention.

FIGS. 4 and 5 show the optical arrangements of compatible optical pickups according to embodiments of the present invention. Specifically, FIG. 4 shows an infinite optical arrangement, and FIG. 5 shows a finite optical arrangement.

Referring to FIGS. 4 and 5, the compatible optical pickup according to the present invention a light source 40 which emits first and second lights I and II having different wavelengths parallel to each other with a predetermined separation. An optical path changer alters a travelling path of incident light from the light source 40 and from an objective lens 55. the objective lens 55 focuses the first and second lights I and II to form a light spot on a recording medium 30.

A photodetector 60 receives and detects the first and second lights I and II incident thereon, separated from one another, and having passed through the optical path changer after having been reflected by the recording medium 30.

While not required in all aspects of the invention, the shown compatible optical pickup further comprises a collimating lens 51 on an optical path between the light source 40 and the objective lens 55 so as to condense incident diverging light. When the collimating lens 51 is arranged as shown in FIG. 4, the collimating lens 51 collimates the diverging light incident from the light source 40 such that the compatible optical pickup has an infinite optical arrangement. When the collimating lens 51 is arranged as shown in FIG. 5 to condense the diverging light incident from the light source 40, or when no collimating lens 51 is used, the compatible optical pickup has a finite optical arrangement.

Figure 6:
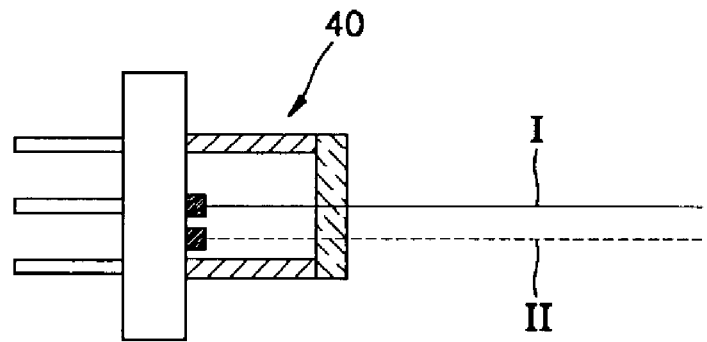
FIG. 6 shows an embodiment of a light source used in a compatible optical pickup according to the present invention.

The light source 40 has a 2-wavelength-1-laser structure, as shown in FIG. 6. the first light I emitted from the light source 40 has a wavelength of about 650 nm and is suitable to perform recording and/or reproduction on a relatively thin first recording medium 30a, such as the DVD family of media. The second light II emitted from the light source 40 has a wavelength of about 780 nm and is suitable to perform recording and/or reproduction on a relatively thick second recording medium 30b, such as the CD family of media.

The first and second lights I and II are emitted from the light source 40 with a predetermined separation range of, for example, from tens to hundreds of micrometers. the first and second lights I and II are also emitted having different divergence angles so as to perform recording and/or reproduction on the first and second recording media 30a and 30b having different formats. the 2-wavelength-1-laser structure of the light source 40 is known in the field, and thus a detailed description and illustration on the structure of the light source 40 will be omitted.

As shown in FIGS. 4 and 5, an embodiment of the optical path changer is a plate-type beam splitter 47, which transmits and reflects incident light in a predetermined ratio. However, it is understood that other types of the optical path changers can be used. For example, a cubic beam splitter, or a polarizing beam splitter and a quarter-wave plate may be used as the optical path changer. As such, the optical path changer is not restricted to the shown embodiment of the optical path changer.

The objective lens 55 focuses the incident first and second lights I and II to form a light spot on a recording surface of the respective first and second recording media 30a and 30b. An embodiment of the objective lens 55 includes an annular lens portion on an entrance surface on which light emitted from the light source 40 is incident and/or an exiting surface facing the recording medium 30. the objective lens 55 having an annular lens portion compatible with the first and second recording media 30a and 30b, for example, a DVD and a CD, having different formats is known in the field, and thus a detailed description and illustration thereon will be omitted.

While not required in all aspects of the invention, the compatible optical pickup further includes a grating 45 on an optical path between the light source 40 and the optical path changer. the grating 45 diffracts the second light II emitted from the light source 40 to obtain $0^{th}$-, $+1^{st}$-, and $-1^{st}$-order diffracted beams. When the grating 45 is further incorporated, a tracking error signal can be detected by a three-beam method when recording and/or reproduction is performed on the second recording medium 30b.

Figure 7:
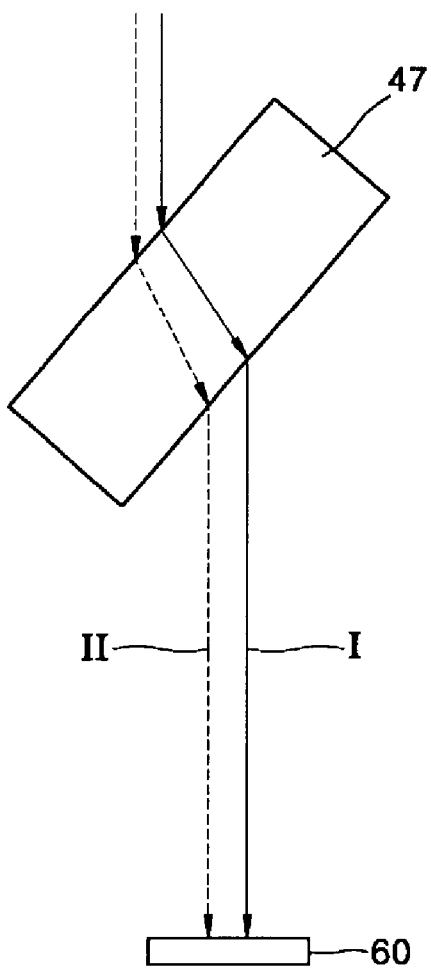
FIG. 7 shows the optical paths of lights incident on a photodetector after being reflected from a recording medium in a compatible optical pickup according to the present invention.

FIG. 7 shows the optical paths of the first and second lights I and II incident on the photodetector 60 after being reflected from the recording medium 30. As shown in FIG. 7, the first and second lights I and II emitted from the light source 40 parallel to and separate from one another are incident on the photodetector 60 separated a predetermined interval from one another. Further, the first and second lights I and II remain parallel after having passed through the optical path changer (i.e., the plate-type beam splitter 47). Accordingly, the photodetector 60 includes first and second main light receiving portions 61 and 63 for the respective first and second lights I and II as shown in FIG. 8.

In the shown embodiment, the first main light receiving portion 61 has a sectional structure including at least four light receiving regions G, H, I, and J capable of independently photoelectrically converting incident light. Likewise, the shown embodiment of the second main light receiving portion 63 has a sectional structure including at least four light receiving regions A, B, C, and D capable of independently photoelectrically converting incident light.

Figure 8:
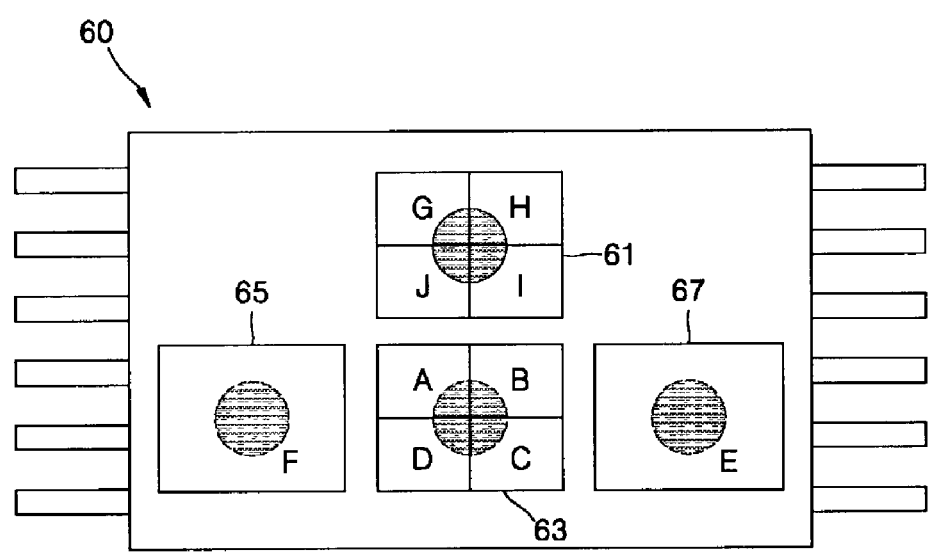
FIG. 8 shows an embodiment of a photodetector used in a compatible optical pickup according to the present invention.

When the grating 45 is further incorporated so as to detect the tracking error signal by the three-beam method, the photodetector 60 further includes a pair of sub-light receiving portions 65 and 67 on both sides of the second main light receiving portion 63, as shown in FIG. 8, to receive the $+1^{st}$ and $-1^{st}$-order diffracted beams split by the grating 45. the sub-light receiving portions 65 and 67 have respective single light receiving regions E and F.

When the compatible optical pickup according to the present invention includes the grating 45 and the photodetector 60 of the structure as shown in FIG. 8, a focus error signal, a tracking error signal, and an information reproduction (radio frequency; RF) signal are detected as follows.

Signals A through J correspond to signals detected by the above light receiving regions A through J. The focus error signal (FES), the tracking error signal (TES), and the information reproduction signal (RF Signal) are detected during reproduction from each of the relatively thin first recording medium 30a, for example, a DVD, and the relatively thick second recording medium 30b, for example, a CD, according to equations (1) and (2) below.

$$FES=\text{phase}(H+J)-\text{phase }(G+I) \ TES=(H+J)-(G+I) \ RF \\ \text{Signal}=G+H+I+J \quad (1)$$

$$FES=\text{phase}(A+C)-\text{phase }(B+D) \ TES=E-F \ RF \\ \text{Signal}=A+B+C+D \quad (2)$$

Figure 9:
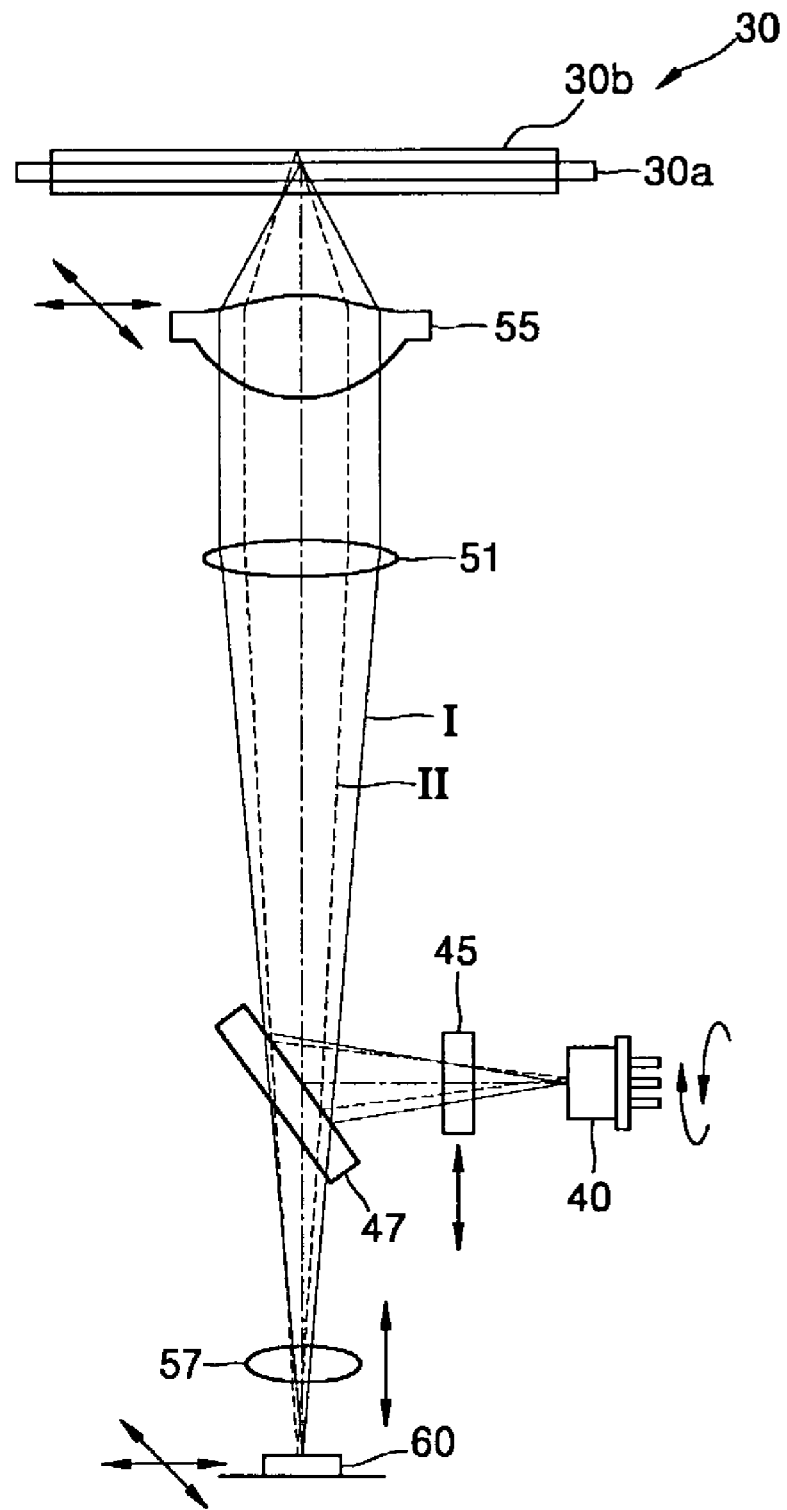
FIG. 9 shows a compatible optical pickup according to an embodiment of the present invention.

According to the embodiment of the invention in FIG. 9, a compatible optical pickup further includes a sensing lens 57 between the optical path changer and the photodetector 60. The sensing lens 57 condenses incident light toward the photodetector 60. The sensing lens 57 can be applied to the infinite and finite optical systems described with reference to FIGS. 4 and 5. the sensing lens 57 has an optical magnification and can compensate for an optical offset by adjusting the focal length to the photodetector 60 by moving the sensing lens 57 in the direction of the optical axis.

According to an embodiment of the present invention, at least one of the light source 40 and the grating 45 is supported by a predetermined support member to be adjusted in the direction of the optical axis or in a rotating direction. Here, the rotating direction refers to the direction in which a predetermined element is rotated clockwise or counter clockwise by a predetermined angle.

Figure 11:
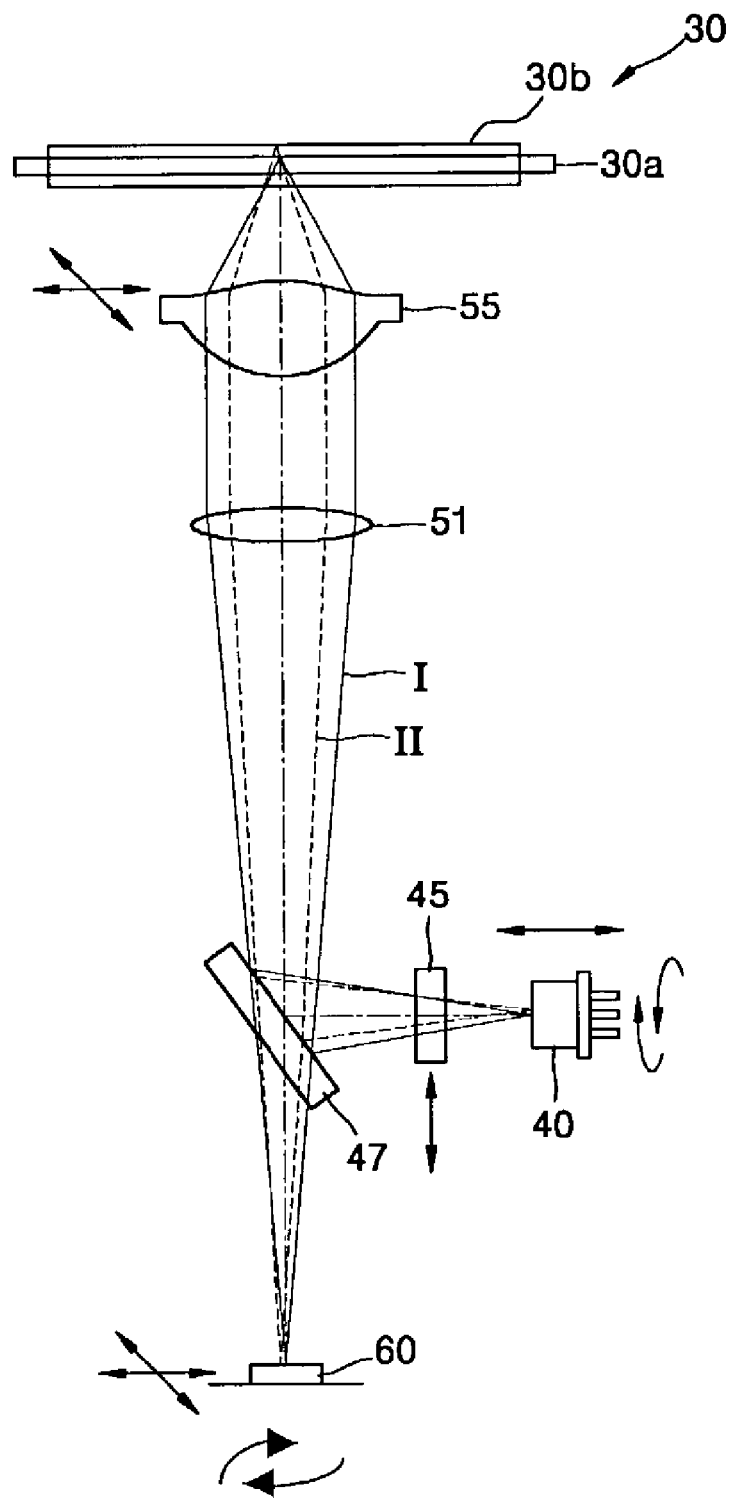
FIG. 11 shows a compatible optical pickup according to an embodiment of the present invention.

According to an embodiment of the invention shown in FIG. 11, the photodetector 60 is supported by a predetermined support member to be adjustable in the rotating direction. The light source 40 and the grating 45 may be supported by separate different support members to be independently adjustable or may be supported by one support member to be adjustable together.

Figure 10:
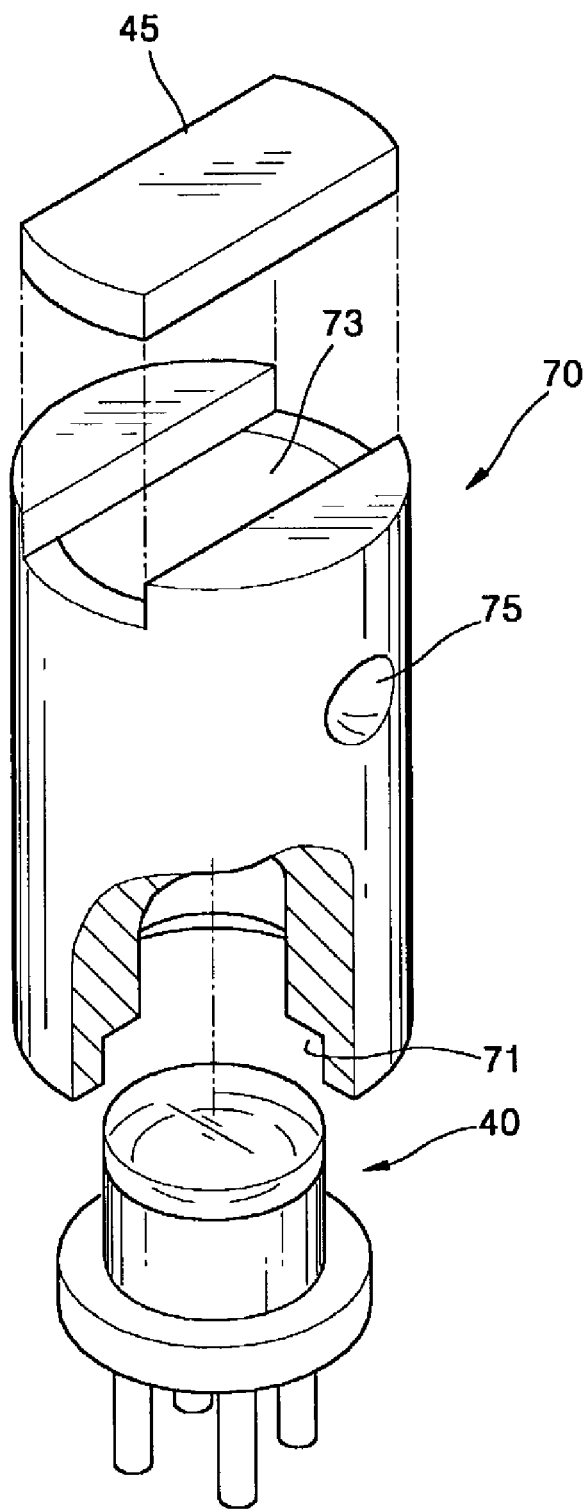
FIG. 10 is a perspective view of an embodiment of a support member used in a compatible optical pickup according to an embodiment of the present invention.

FIG. 10 shows an example of one support member 70 for supporting both of the light source 40 and the grating 45. In FIG. 10, the support member 70 includes a first mount portion 71 for the light source 40 and a second mount portion 73 for the grating 45 in the direction in which light emitted from the light source 40 proceeds, the support member 70 is hollow so as to transfer light emitted from the light source 40. While not required in all aspects of the invention, the support member 70 has a cylindrical appearance to adjust the light source 40 and the grating 45 supported by the support member 70 in the rotating direction and further includes at least one adjust groove 75 into which a jig (not shown) for pushing or pulling the support member 70 in the direction of the optical axis or in the rotating direction is inserted. In aligning the optical axis to assemble the compatible optical pickup according to an aspect of the present invention, the jig is inserted into the adjust groove 75 to adjust the support member 70 in the direction of the optical axis (i.e., along the optical path between the light source 40 and the optical path changer) and/or in the rotating direction. The jig is removed after the optical axis alignment is complete.

The support member 70 is not limited to the structure of FIG. 10, which is an illustration of only one example of the support member 70 for supporting the light source 40 and the grating 45 together. However, when the light source 40 and the grating 45 are supported to be separately adjustable, it is generally preferable that one support member has a cylindrical appearance, similar to the support member 70 of FIG. 10. It is also generally preferable that a support member (not shown) for supporting the photodetector 60 to be adjustable in the rotating direction has a cylindrical appearance, similar to the support member 70 of FIG. 10. the support member for the photodetector 60 has a similar structure to the above-described support member 70, and thus a description and separate illustration thereon will be omitted. It is also understood that the support member could be constructed as a single unit having portions which are separately rotatable and/or separately movable along the optical path.

The optical axes of the compatible optical pickup according to the present invention are aligned through the following adjusting process. In FIGS. 4 and 5, the arrows indicate the directions in which the optical elements are adjusted to align the optical axis for the first recording medium 30a, and the optical axis for the second recording medium 30b.

According to the present invention, a first optical axis for the first recording medium 30a and a second optical axis for the second recording medium 30b are adjusted while the light source 40 is operated to emit the first and second lights I and II, respectively.

In an embodiment of the present invention, while the light source 40 is operated to emit the first light I for the first recording medium 30a, the photodetector 60 is adjusted to be aligned with the first optical axis for the first recording medium 30a. The light source 40 is adjusted in a direction of the optical axis (i.e., along an optical path between the light source 40 and the optical path changer) to correct for chromatic aberration from the objective lens 55 or an offset in the focusing direction occurring due to the shape and manufacturing error of jig structures for the optical elements. When the sensing lens 57 is included, as shown in FIG. 9, the sensing lens 57 can be adjusted in a direction of the optical axis (i.e., along an optical path between the photodetector 60 and the optical path changer) instead of or in addition to the light source 40. Alternatively, both the light source 40 and the sensing lens 57 may be adjusted in the direction of the optical axis. The tilt of the objective lens 55 is adjusted in x and y directions. As a result, the first optical axis alignment for the optical elements involved in recording data on and/or reproducing data from the first recording medium 30a is complete.

With the first optical axis alignment completed, an initial position of a second optical axis for the second recording medium 30b (i.e., the second optical axis for the optical elements involved in recording data on and/or reproducing data from the second recording medium 30b) is determined. While the light source 40 is operated to emit the second light II, the light source 40 is rotatably adjusted in the rotating direction (i.e., rotating about the optical path) to align the second optical axis for the second recording medium 30b. When the grating 45 is additionally incorporated, the grating 45 is rotatably adjusted in the rotating direction such that the three diffracted light beams are received at appropriate positions on the photodetector 60. As a result, the second optical axis alignment for the second recording medium 30b is complete.

When the light source 40 and the grating 45 are separately supported by different support members (not shown), after the first optical axis alignment for the first recording medium 30a, the support member for the light source 40 is rotatably adjusted in the rotating direction to position the second light II on the photodetector 60, and the support member for the grating 45 is rotatably adjusted in the rotating direction such that the three diffracted light beams are received at appropriate positions on the photodetector 60.

Alternatively, when the light source 40 and the grating 45 are supported together by one support member 70, as described with reference to FIG. 10, after the first optical axis alignment for the first recording medium 30a, the support member 70 for both of the light source 40 and the grating 40 is rotatably adjusted in the rotating direction to simultaneously adjust the light source 40 and the grating 45 and thus to align the second optical axis for the second recording medium 30b. In this embodiment, it is also preferable that the photodetector 60 is rotatably adjusted in the rotating direction such that the second light II emitted from the light source 40 is received at an appropriate position on the photodetector 60.

When the first optical axis for the first recording medium is changed during the second optical axis alignment for the second recording medium 30b as described above, the first optical axis for the first recording medium 30a may be additionally adjusted, as necessary.

In another embodiment of the present invention, after the position of the photodetector 60 is initially adjusted with respect to the second optical axis for the second recording medium 30b, the light source 40 is adjusted in the direction of the optical axis to correct for chromatic aberration from the objective lens 55 or an offset in the focusing direction occurring due to the shape and manufacturing error of jig structures for the optical elements. Analogous to the above embodiment, when the sensing lens 57 is further incorporated, the sensing lens 57, instead of or in addition to the light source 40, can be adjusted in the direction of the optical axis.

When the grating 45 is additionally incorporated, the light source 40 and/or the grating 45 are rotatably adjusted in the rotating direction to adjust the positions of three diffracted light beams received on the photodetector 60 and to adjust a phase difference between the $+1^{st}$ and $-1^{st}$ order diffracted beams incident on the photodetector 60. In this embodiment, the grating 45 is rotatably adjusted in the rotating direction to adjust a phase difference between the +1$^{st}$ and −1$^{st}$ order diffracted beams such that, for example, the phase difference between the +1$^{st}$ and −1$^{st}$ order diffracted beams due to the shapes of pits on the recording medium is roughly 180°.

After the second optical axis alignment for the second recording medium 30 is completed as described above, the light source 40 is rotatably adjusted in the rotating direction, and the tilt of the objective lens 55 is adjusted in x and y directions. As a result, the optical axis alignment for the first and second recording media 30a and 30b in the compatible optical pickup according to the present invention is complete.

In another embodiment of the present invention, the photodetector 60 is initially adjusted to be aligned with the second optical axis for the second recording medium 30b. Here, an offset in the direction of the optical axis is not adjusted. When the grating 45 is incorporated, the grating 45 is rotatably adjusted in the rotating direction to start adjusting the positions of the three light beams for the tracking error signal. Next, to adjust the first optical axis for the first recording medium 30a, the light source 40 is rotatably adjusted in the rotating direction to be aligned with the first optical axis for the first recording medium 30a. Next, the tilt of the objective lens 55 is adjusted in x and y directions, thereby completing the optical axis alignment for the first and second recording media 30a and 30b. Next, it is checked whether the second optical axis for the second recording medium 30b is changed. If the second optical axis for the second recording medium 30 is greatly displaced from its initial adjusted position, the light source 40 is finely readjusted in the direction of the optical axis and/or in the rotating direction.

The above-described optical axis alignment technique can be used for both infinite and finite optical systems. the optical axis alignment technique according to the present invention described above can be applied to the optical structures shown in FIGS. 4, 5, 8 and 11, and a variety of optical pickups having other structures.

Although the optical axis alignment technique has been described with reference to an optical pickup where the center axis of the objective lens 55 matches an axis of the first light I emitted from the light source 40, the above-described optical axis alignment technique can be appropriately modified according to the arrangement structure of the optical pickup.

Further, it is understood that other light sources could be used instead of the 2-wavelength-1-laser type shown so long as the emitted light beams are separated from each other to follow a parallel light path.

The compatible optical pickup according to the present invention described above does not need to compensate for the optical axis mis-alignment between two light beams having different wavelengths which are emitted from a light source, separated from one another, and thus the optical axis can be simply adjusted.

While this invention has been particularly shown and described with reference to embodiments thereof, it will be understood by those skilled in the art that various changes in form and details may be made therein without departing from the spirit and scope of the invention as defined by the accompanying claims and equivalents thereof.

What is claimed is:

1. A compatible optical pickup compatible with first and second recording media having different thicknesses, comprising:

a light source which emits first and second lights having different wavelengths, separated a predetermined interval from one another, for the first and second recording media, respectively;

an objective lens disposed in an optical path between the light source and a received one of the first and second recording media, which focuses the emitted one of first or second lights to form a light spot on the received one recording medium;

a photodetector which receives and detects the emitted one of the first and second lights incident thereon, separated from one another, the first and second lights having passed through an optical path changer after having been reflected from the received one recording medium;

an optical path changer to selectively alter traveling paths of incident light proceeding between the light source, the objective lens, and the photodetector;

a support member which supports the light source and allows the light source to be linearly and rotatably adjusted with respect to an optical path between the light source and the optical path changer;

a grating in the optical path between the light source and the optical path changer and which diffracts the second light emitted from the light source to provide diffracted light beams; and another support member which supports the grating to be linearly and rotatably adjusted with respect to the optical path.

2. The compatible optical pickup of claim 1, wherein the photodetector comprises first and second main light receiving portions to separately receive and detect the first and second lights.

3. The compatible optical pickup of claim 2, wherein each of the first and second main light receiving portions is divided into at least four sections.

4. The compatible optical pickup of claim 1, wherein the photodetector is rotatably adjustable in a rotating direction.

5. A compatible optical pickup compatible with first and second recording media having different thickness, comprising:

a light source which emits first and second lights having different wavelengths, separated a predetermined interval from one another, for the first and second recording media, respectively;

an objective lens disposed in an optical path between the light source and a received one of the first or second recording media, which focuses the emitted one of the first or second lights to form a light spot on the received one recording medium;

a photodetector which receives and detects the emitted one of the first or second lights incident thereon, separated from one another, the first and second lights having passed through an optical path changer after having been reflected from the received one recording medium;

the optical path changer to selectively alter traveling paths of incident light proceeding between the light source, the objective lens, and the photodetector;

a support member which supports the light source and allows the light source to be linearly and rotatably adjusted with respect to an optical path between the light source and the optical path changer; and a grating in the optical path between the light source and the optical path changer and which diffracts the second light emitted from the light source to provide at least three diffracted light beams;

wherein the support member supports both the light source and the gratting so as to be linearly and rotatably adjustable with respect to the optical path.

6. The compatible optical pickup of claim 5, wherein the photodetector further comprises a pair of sub-light receiving portions which receive and detect a corresponding pair of the diffracted light beams of the second light diffracted by the grating.

7. An optical pickup compatible with first and second recording media having different thicknesses, comprising:
a light unit which emits first and second lights having different wavelengths along optical paths separated a predetermined interval from one another, the first and second lights being useable to record and/or reproduce data with respect to corresponding first and second recording media;
an objective lens which focuses an emitted one of first and second lights to form a light spot on a received one of the first and second recording media;
a photodetector which receives the emitted one of the first and second lights after being reflected from the received one recording medium;
an optical path changer to selectively alter traveling paths of incident light proceeding between the light unit, the objective lens, and the photodetector;
a support member which supports the light unit and allows the light unit to be rotatably and linearly adjusted with respect to an optical path between the light source and the optical path changer; and
a grating which diffracts one of the or second lights, wherein the support member rotatably and linearly supports the grating and the light unit, and the diffracted light is received at corresponding portions of the photodetector to determine a tracking error signal.

8. The optical pickup of claim 7, wherein the light unit is movable along an optical path between the optical path changer and the light unit.

9. The optical pickup of claim 7, wherein the support member supports the photodetector and is further movable in a direction perpendicular to a direction of an optical path between the photodetector and the optical path changer.

10. The optical pickup of claim 8, further comprising:
a sensor lens which focuses the emitted one of the first and second lights onto the photodetector, and
another support member which supports the sensor lens to be movable along an optical path between the optical path changer and the photodetector.

11. The optical pickup of claim 7, further comprising another support member which supports the objective lens to be able to tilt along axes perpendicular to a direction of an optical path between the objective lens and the optical path changer.

12. The optical pickup of claim 7, wherein the photodetector comprises first and second light receiving portions to receive the corresponding reflected first and second lights, and the rotational adjustment of the supported one of the light unit and the photodetector aligns an optical axis of one of the first and second lights.

13. An optical pickup compatible with first and second recording media having different thicknesses, comprising:
a light unit which emits first and second lights having different wavelengths along optical paths separated a predetermined interval from one another, the first and second lights being useable to record and/or reproduce data with respect to corresponding first and second recording media;
an objective lens which focuses an emitted one of first and second lights to form a light spot on a received one of the first and second recording media;
a photodetector which receives the emitted one of the first and second lights after being reflected from the received one recording medium;
a support member which supports the light unit, and provides
linear adjustment of the light unit along an optical path, and
rotational adjustment of the light unit with respect to the path; and
a grating receiving second light and diffracting second light emitted from the light unit to provide diffracted light; and
another support member which supports the grating to be linearly and rotatably adjusted with respect to the optical path.

14. An optical pickup compatible with first and second recording media having different thicknesses, comprising:
a light unit which emits first and second lights having different wavelengths along optical paths separated a predetermined interval from one another, the first and second lights being useable to record and/or reproduce data with respect to corresponding first and second recording media;
an objective lens which focuses an emitted one of first and second lights to form a light spot on a received one of the first and second recording media;
a photodetector which receives the emitted one of the first and second lights after being reflected from the received one recording medium;
an optical path changer to selectively alter traveling paths of incident light proceeding between the light unit, the objective lens, and the photodetector;
a support member which supports the light unit, and provides
linear adjustment of the light unit to adjust an optical axis of the first light, and
rotational adjustment of the light unit to adjust an optical axis of the second light;
a grating receiving second light and diffracting second light emitted from the light unit to provide diffracted light; and
another support member which supports the grating to be linearly and rotatably adjusted with respect to the optical path.

* * * * *

UNITED STATES PATENT AND TRADEMARK OFFICE
CERTIFICATE OF CORRECTION

| | | |
|---|---|---|
| PATENT NO. | : 7,145,859 B2 | Page 1 of 1 |
| APPLICATION NO. | : 10/244605 | |
| DATED | : December 5, 2006 | |
| INVENTOR(S) | : Soo-han Park et al. | |

It is certified that error appears in the above-identified patent and that said Letters Patent is hereby corrected as shown below:

Column 12, Line 7, after "of" insert --the--.

Column 12, Line 40, change "thickness," to --thicknesses--.

Column 13, Line 2, change "gratting" to --grating--.

Column 13, Line 17, change "and" to --or--.

Column 13, Line 19, change "and" to --or--.

Column 13, Line 30, insert --first-- before "or".

Column 13, Line 36, change "an" to --the--.

Column 14, Line 11, change "and" to --or--.

Column 14, Line 20, after "the" insert --optical--.

Column 14, Line 37, change "and" to --or--.

Signed and Sealed this

Sixth Day of May, 2008

JON W. DUDAS
*Director of the United States Patent and Trademark Office*